Oct. 12, 1937.  J. R. ZACHS  2,095,943
MATHEMATICAL CALCULATING DEVICE
Filed Jan. 10, 1936

INVENTOR
Jennie R. Zachs
by
Arthur B. Jenkins,
ATTORNEY.

Patented Oct. 12, 1937

2,095,943

UNITED STATES PATENT OFFICE 2,095,943

MATHEMATICAL CALCULATING DEVICE

Jennie R. Zachs, Hartford, Conn.

Application January 10, 1936, Serial No. 58,547

2 Claims. (Cl. 33—1)

My invention relates to that class of devices which may be used for the production of algebraic graphs, and an object of my invention, among others, is the provision of means whereby the use of paper ruled for plotting purposes may be dispensed with.

One form of a device embodying my invention and in the construction and use of which the objects herein set out, as well as others, may be attained, is illustrated in the accompanying drawing in which Figure 1 is a face view of my improved calculating device.

Figure 1:
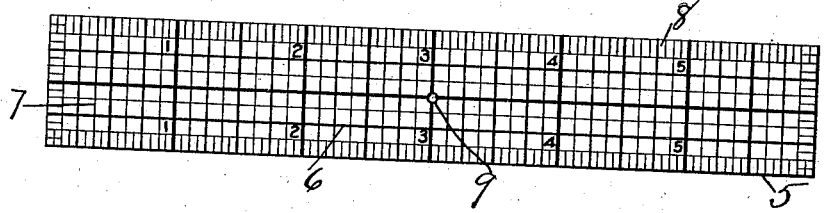
Figure 2:
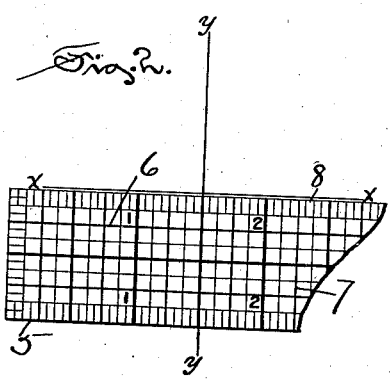
Figure 2 is a view of a portion of the device illustrating its application.

In the solution of algebraic problems by means of which graphs are produced for certain purposes a common expedient has been the use of plotting paper which is ruled into squares, these squares being made use of in solving the problems. This paper is somewhat expensive and therefore I have provided means whereby the use of such paper may be dispensed with. In practicing my invention a piece of material, preferably having some rigidity, is employed and this piece of material is ruled to resemble the ruling of plotting paper, and at the intersection of certain ruled lines holes are formed for the insertion of a marking instrument, as a lead pencil. In order to extend the use of my improved calculating device I preferably employ a ruler 5 ruled along its edges after the manner of a ruler of common construction. Upon the face of this ruler I provide lines 6 extending in one direction and evenly spaced apart, and extending crosswise of said lines I provide other lines 7 which are spaced apart the same distance as the lines 6, thereby providing squares to resemble the squares commonly found on plotting paper. Some lines may if desired be extensions of the graduations 8 along the edge of the ruler.

At a point or points of the intersection of these lines, that is, at the corners of certain squares, I provide a hole or holes 9 for the insertion of a marking instrument, as a lead pencil, by means of which a mark may be placed upon paper upon which the instrument is placed. The use of the device is described as follows.

To solve graphically the equations $3x-4y$ plus 20 equals 0 and $2x$ plus $y$ plus 6 equals 0 we proceed as follows: First we lay out on a plain piece of paper the $x$ axis 10 and the $y$ axis 11, one of these axes, as the $x$ axis, being obtained by drawing a pencil along the edge of the ruler horizontally placed, and then the other axis, as the $y$ axis, is obtained by placing the edge of the ruler midway between the ends of the horizontal line and at right angles thereto as may be determined by registering one of the crosswise lines on the ruler with the line 10 or $x$ axis, this position of the ruler being readily obtained by viewing the line already made through the transparent material of the ruler. A pencil is then drawn along the edge of the ruler to produce the $y$ axis.

Figure 3:
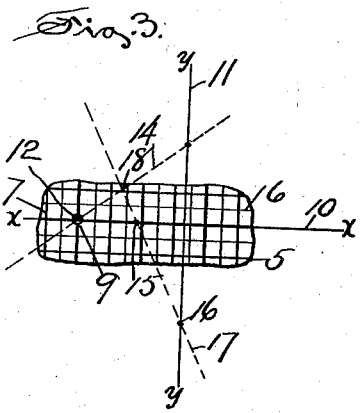
Figure 3 shows a fragment of the device illustrating its application.
Figure 4:
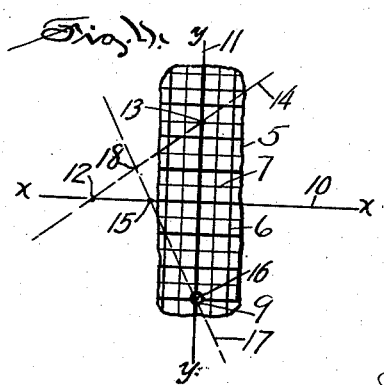
Figure 4 is a view similar to Figure 3 illustrating the device in another position.

By well known algebraic methods the values of $x$ and $y$ are obtained, it being found that $x$ equals $-6\frac{2}{3}$ and $y$ equals 5. The ruler is now placed upon the paper with a line intersecting the hole registering with the $x$ axis and with the hole located the distance of $6\frac{2}{3}$ squares from the $y$ axis and to the left thereof, as shown in Fig. 3, this position to the left of the $y$ axis being determined by the minus quantity $6\frac{2}{3}$. A dot 12 is made on the $x$ axis as by the insertion of a pencil point through the hole. In a similar manner the ruler is placed upon the diagram with the line intersecting the hole registering with the $y$ axis, the hole being located the distance of 5 squares from and above the $x$ axis, this position being denoted by the value 5 of $y$, a dot 13 being made on the $y$ axis as by the insertion of a pencil point through the hole. The ruler is now made use of to draw a line 14 through the two pencil points made on the $x$ and $y$ axes and as shown in Figure 4.

The values of $x$ and $y$ in the second equation having been found to be relatively $-3$ and $-6$, the point denoting the value of $x$ is determined in the manner above described by the use of the ruler and placing the hole the distance of 3 squares on the $x$ axis and to the left as denoted by the minus quantity of $x$, and the dot 15 is made through the hole. The point $-6$, the value of $y$, is obtained in the same manner by placing the hole a distance of 6 squares on the $y$ axis below the $x$ axis as denoted by the minus quantity of $y$, and the dot 16 is made through the hole. Now by the use of the ruler the line 17 is drawn through the two dots as shown in Figure 4. The problem of plotting is thus completed by the use of the ruler and upon a plain piece of paper, the use of plotting paper being thus dispensed with.

While a single hole at the intersection of the lines at one corner of a square has been shown herein it will be obvious that other holes may be made, if desired, at the corners of other squares.

The coordinates having been obtained as above described, now applying the ruler, we find that such coordinates at the intersection 18 of the lines 14 and 17 are minus 4 and plus 2.

I claim:
1. A mathematical calculating device including a piece of transparent material, lines displayed in squares on said piece, and a perforation through the piece at the corner of a square.

2. A mathematical calculating device including a piece of transparent material, lines displayed in squares on said piece, said lines being alternately light and heavy, and a perforation through said piece at the corner of a square.

JENNIE R. ZACHS.